(12) United States Patent
Andrews et al.

(10) Patent No.: US 6,618,407 B1
(45) Date of Patent: Sep. 9, 2003

(54) UNCOOLED UNIVERSAL LASER MODULE

(75) Inventors: George Edward Andrews, Fleetwood, PA (US); Timothy P. Bock, Kutztown, PA (US); Fridolin Ludwig Bosch, Bethlehem, PA (US); Timothy Butrie, Orefield, PA (US); Thomas James Miller, Jr., Fleetwood, PA (US); Leo Anthony Procida, Alburtis, PA (US); Stephen James Salko, Weatherly, PA (US); Shaun P. Scrak, Souderton, PA (US); Rao V. Yelamarty, Allentown, PA (US)

(73) Assignee: Triquint Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/141,143

(22) Filed: Aug. 27, 1998

(51) Int. Cl.⁷ ............................................. H01S 5/042
(52) U.S. Cl. ................................................... 372/38.02
(58) Field of Search .................................. 359/171, 187, 359/173; 372/38, 29, 82, 38.1, 38.02, 29.021

(56) References Cited

U.S. PATENT DOCUMENTS

| | | | |
|---|---|---|---|
| 5,126,701 A | * | 6/1992 | Adlerstein .................. 333/172 |
| 5,500,758 A | | 3/1996 | Thompson et al. |
| 5,561,546 A | | 10/1996 | Esman |
| 5,682,256 A | | 10/1997 | Motley et al. |
| 5,717,708 A | | 2/1998 | Mells |
| 5,739,938 A | * | 4/1998 | Goutzoulis et al. ......... 359/171 |
| 5,802,228 A | * | 9/1998 | Bock et al. .................... 385/78 |
| 5,881,193 A | * | 3/1999 | Anigbo et al. ................ 385/93 |
| 6,151,340 A | * | 11/2000 | Rivers ......................... 372/32 |
| 6,175,437 B1 | * | 1/2001 | Diel et al. .................. 359/180 |
| 6,181,718 B1 | * | 1/2001 | Kobayashi et al. ........... 372/34 |
| 6,218,955 B1 | * | 4/2001 | Conklin ................. 372/825.32 |

* cited by examiner

Primary Examiner—James Davie
(74) Attorney, Agent, or Firm—Dickstein Shapiro Morin & Oshinsky LLP

(57) ABSTRACT

An uncooled, through-hole configured laser module adapted to receive and transmit RF signals to a laser at bandwidths from direct current (DC) to about ten gigahertz. The laser module incorporates an option for two pin-out configurations. One pin-out configuration has one ground pin and one signal pin for operation at about one gigabit/second or one gigahertz. The second high performance pin-out uses two ground pins and one signal pin for operation up to about ten gigabit/second or ten gigahertz.

58 Claims, 8 Drawing Sheets

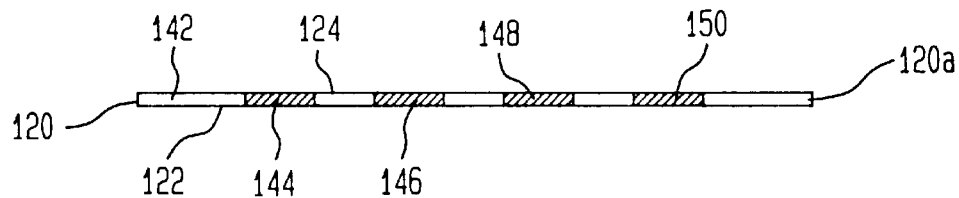
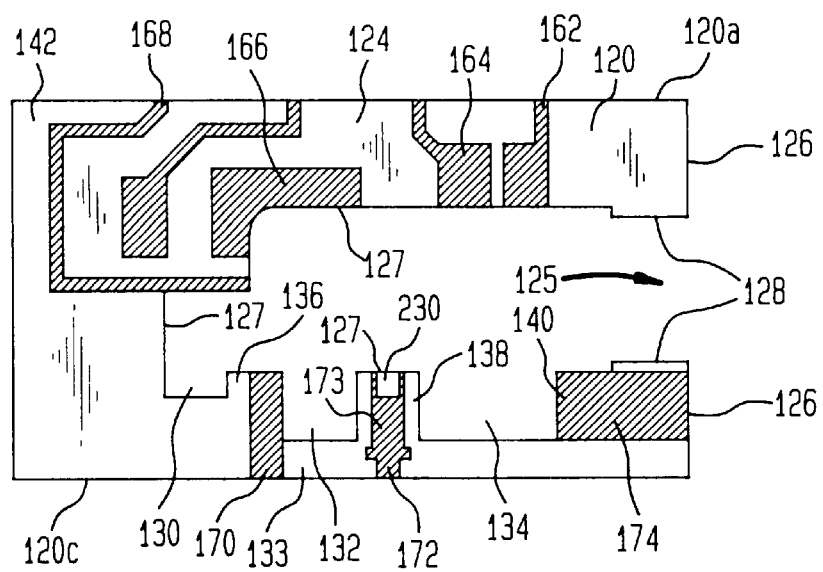
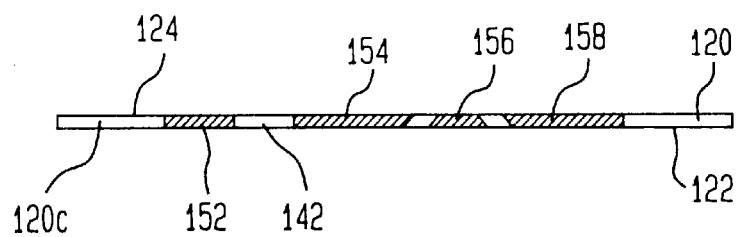
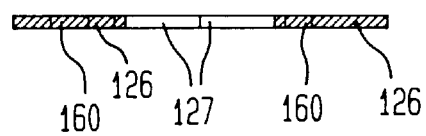

UNCOOLED UNIVERSAL LASER MODULE

FIELD OF THE INVENTION

The present invention relates to a laser module, and more particular to an uncooled semiconductor laser module adapted for use in a fiber optics communication network.

BACKGROUND OF THE INVENTION

Laser module designs are useful for analog transmission, e.g., CATV, personal communication systems (PCS), cellular, and for low bit rate digital transmission at a bit rate of about one gigabit/second or below, and for high bit rate digital transmission, e.g., transmission at a bit rate greater than about one gigabit/second.

Some of the laser module designs are cooled. Such designs often utilize a thermal electric cooler (TEC) to provide cooling, or heating, depending upon the voltage polarity used, to the laser module. The presence of the TEC presents several disadvantages. One disadvantage is that the TEC increases the size of the laser module, making the module bulky. Another disadvantage is that the TEC adds to the cost of the laser module. Yet another disadvantage is that the presence of the TEC creates the need for a greater number of electrical connections which must be performed, adding further to the cost of the module. An example of such a laser module design is a cooled ILM (Isolated Laser Module) which is capable of use in analog CATV, analog personal communication systems (PCS), analog cellular and up to 2.5 gigabit/second digital transmissions.

Some laser module designs incorporate what is termed a butterfly configuration. The butterfly configuration is a configuration by which the laser module is electrically connected to a circuit board. In a butterfly configured design, the electrical leads are directly connected with the optical subassembly portion of the laser module. With such a design, the loss of bit speed due to signal degradation due to multiple reflections is lessened, and a transmission rate in excess of ten gigabits/second is achievable. A disadvantage to such a design is that it is prohibitively expensive to manufacture and/or test butterfly configured laser modules in high volume.

SUMMARY OF THE INVENTION

The disadvantages of the conventional laser module designs are overcome to a great extent by the present invention, which relates to an uncooled laser module adapted to receive and input radio frequency signals to a laser at direct current (DC) to ten gigahertz. This is accomplished through the inclusion of two pin configurations in a single laser module package. In a preferred embodiment of the laser module, there is included signal-ground circuitry matching an industry-wide standard capable of receiving and transmitting radio frequency (RF) signals to a laser at a bandwidth below about one gigahertz and ground-signal-ground circuitry for a high performance configuration capable of receiving and transmitting RF signals to a laser at a bandwidth up to ten gigahertz.

In an aspect of the present invention, the ground-signal-ground circuitry includes a signal pin, two ground pins, and a first characteristic line, such as a coplanar waveguide, in electrical connection with the ground and signal pins and with a metal pad, a second characteristic line, such as a microstrip, and a microstrip ground. The metal pad and microstrip ground act as grounds for an RF signal input from a driver to the signal pin, and transmitted therefrom through the coplanar waveguide and the microstrip and on to an optical subassembly including a laser. Further, the microstrip has a specific impedance and a specific electrical length.

In another aspect of the present invention, the signal-ground circuitry includes a signal pin, a ground pin, and a first characteristic line, such as a coplanar waveguide, in electrical connection with the signal pin, the ground pin, and two metal pads. One of the metal pads acts as a ground for an RF signal input from a driver to the signal pin, and transmitted therefrom through the coplanar waveguide and the other metal pad and on to an optical subassembly including a laser.

In another aspect of the present invention, the ground pin of the signal-ground circuitry is the signal pin of the ground-signal-ground circuitry.

The foregoing and other advantages and features of the invention will be more readily understood from the following detailed description of the invention, which is provided in connection with the accompanying drawings.

BRIEF DESCRIPTION OF THE DRAWINGS

FIG. 1b is a side view of the laser module of FIG. 1a.

FIG. 1c is a front view of the laser module of FIG. 1a.

FIG. 1d is an opposite side view of the laser module of FIG. 1a.

FIG. 2a is a side view of the first ceramic layer of the laser module of FIG. 1a.

FIG. 2b is a top view of the first ceramic layer of the laser module of FIG. 1a.

FIG. 2c is an opposite side view of the first ceramic layer of the laser module of FIG. 1a.

FIG. 2d is a front view of the first ceramic layer of the laser module of FIG. 1a.

FIG. 3a is a side view of the second ceramic layer of the laser module of FIG. 1a.

FIG. 3b is a top view of the second ceramic layer of the laser module of FIG. 1a.

FIG. 3c is an opposite side view of the second ceramic layer of the laser module of FIG. 1a.

FIG. 3d is a front view of the second ceramic layer of the laser module of FIG. 1a.

FIG. 4a is a side view of the third ceramic layer of the laser module of FIG. 1a.

FIG. 4b is a top view of the third ceramic layer of the laser module of FIG. 1a.

FIG. 4c is an opposite side view of the third ceramic layer of the laser module of FIG. 1a.

FIG. 4d is a front view of the third ceramic layer of the laser module of FIG. 1a.

FIG. 5a is a side view of the fourth ceramic layer of the laser module of FIG. 1a.

FIG. 5b is a top view of the fourth ceramic layer of the laser module of FIG. 1a.

FIG. 5c is an opposite side view of the fourth ceramic layer of the laser module of FIG. 1a.

FIG. 5d is a front view of the fourth ceramic layer of the laser module of FIG. 1a.

FIG. 6 is a top view of the seal ring of the laser module of FIG. 1a.

FIG. 9 is an equivalent electrical circuit diagram of the ground-signal-ground signal path of the laser module of FIG. 1a.

FIG. 10 is an equivalent electrical circuit diagram of the signal-ground signal path of the laser module of FIG. 1a.

DETAILED DESCRIPTION OF THE PREFERRED EMBODIMENTS

Figure 1A:
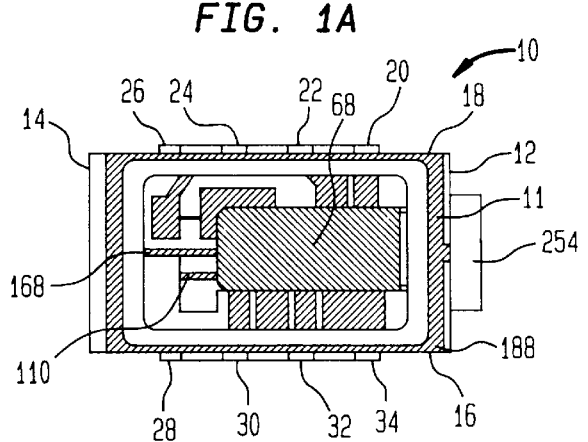
FIG. 1a is a top view of a preferred embodiment of the laser module constructed in accordance with the present invention.
Figure 1C:
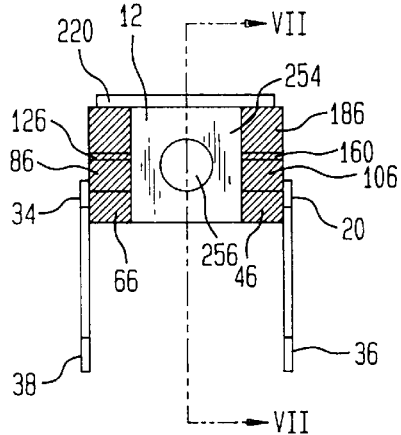

Referring now to FIGS. 1A–7, an uncooled universal laser module 10 is illustrated. With specific reference to FIGS. 1A–1D, the laser module 10 includes a package body 11 and a metal nose 254. The package body 11 is comprised of a first ceramic layer 40, a second ceramic layer 80, a third ceramic layer 120, a fourth ceramic layer 180, and a seal ring 220. Each of the ceramic layers 40, 80, 120, 180 has two long sides and two short sides, the long sides being generally parallel to one another and the short sides being generally parallel to one another. The ceramic layers 40, 80, 120, 180 are stacked one upon the other such that the long sides of the ceramic layers make up two long sides 16, 18 of the package body 11 and the short sides of the ceramic layers make up two short sides 12, 14 of the package body 11. The short side 12 of the package body shall also be referred to herein as the front side 12 of the package body 11.

Figure 5A:
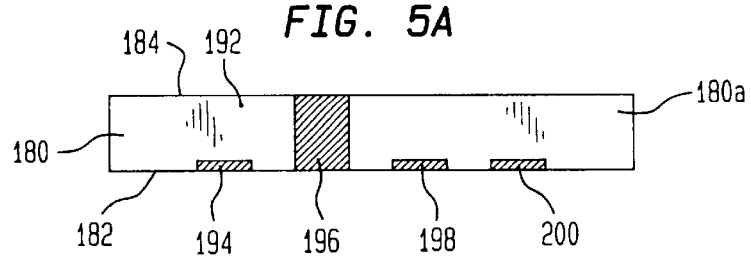
Figure 5B:
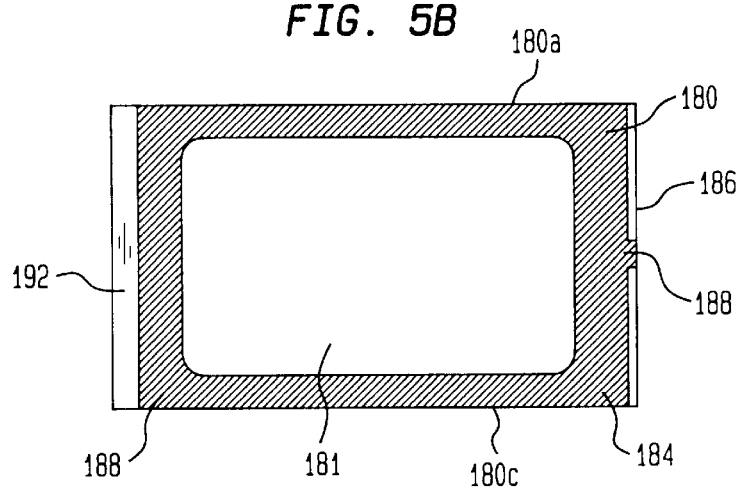
Figure 5C:
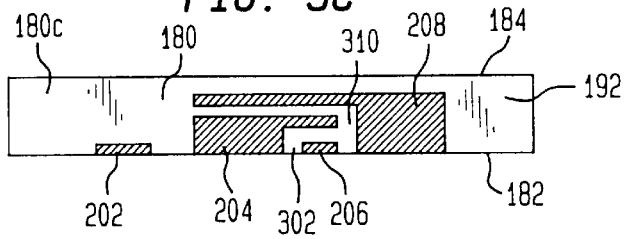
Figure 5D:
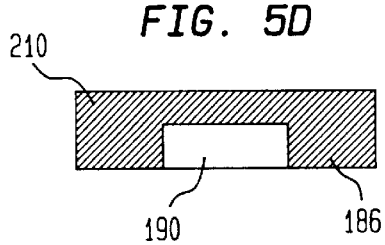
Figure 6:
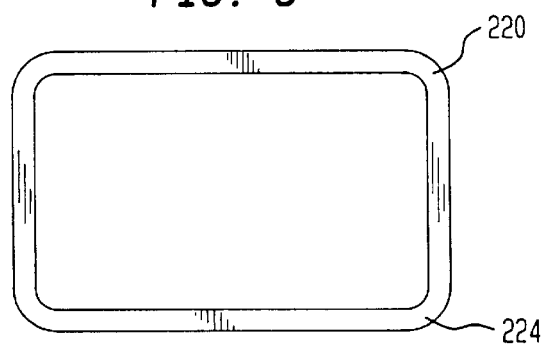

More specifically, the ceramic layer 40 includes sides 40a and 40c (FIGS. 2a–2c), the ceramic layer 80 includes sides 80a and 80c (FIGS. 3a–3c), the ceramic layer 120 includes sides 120a and 120c (FIGS. 4a–4c), and the ceramic layer 180 includes sides 180a and 180c (FIGS. 5a–5c). Sides 40a, 80a, 120a and 180a make up the long side 18, while sides 40c, 80c, 120c and 180c make up the long side 16. As will be explained in greater detail below, the ceramic layers 40, 80, 120, 180 each has a front surface 46, 86, 126, 186, respectively, which collectively make up the front side 12.

Each of the ceramic layers 40, 80, 120, 180 includes both unmetallized ceramic portions and metallized ceramic portions. The metallized ceramic portions, as well as all the metallic portions in the layers 40, 80, 120, 180 include pre-metallized tungsten on ceramic with nickel, gold plating.

The first ceramic layer 40 includes an unmetallized ceramic portion 48, metallized ceramic portions 50, 52, 54 and 56 on side 18, metallized ceramic portions 58, 60, 62 and 64 on side 16. Finally, the first ceramic layer 40 includes a metallized ceramic portion 66 on the front side 12.

The second ceramic layer 80 has an unmetallized ceramic portion 89. Further, the second ceramic layer 80 includes metallized ceramic portions 90, 92, 94 and 96 on side 18 and metallized ceramic portions 98, 100, 102 and 104 on side 16. Finally, the second ceramic layer 80 includes metallized ceramic portions 106 on the front side 12.

The third ceramic layer 120 includes an unmetallized ceramic portion 142. The third ceramic layer 120 also includes metallized ceramic portions 144, 146, 148 and 150 on side 18 and metallized ceramic portions 152, 154, 156 and 158 on side 16. Also, the third ceramic layer 120 includes metallized ceramic portions 160 on the front side 12.

The fourth ceramic layer 180 includes an unmetallized ceramic portion 192. The fourth ceramic layer 180 further includes metallized ceramic portions 194, 196, 198 and 200 on side 18 and metallized ceramic portions 202, 204, 206 and 208 on side 16. The fourth ceramic layer 180 also includes a metallized ceramic portion 210 on the front side 12.

Each of the ceramic layers 40, 80, 120 and 180, as well as the seal ring 220, includes a top surface and a base surface. Specifically, as best illustrated in FIGS. 2a, 2b, 2c, 2d, the first ceramic layer 40 includes a base surface 42, a top surface 44, and a front surface 46. The front surface 46 is coextensive with the front side 12 of the laser module 10. The front surface 46 includes the metallized ceramic portion 66 and a cutout portion 70. The top surface 44 of the first ceramic layer 40 includes an unmetallized ceramic portion 48 as well as a metal pad 68. The metal pad 68 shall also be referred to herein as the optical subassembly (OSA) ground 68.

The second ceramic layer 80, best illustrated in FIGS. 3a, 3b, 3c, 3d, has a base surface 82, a top surface 84, a surface 86 containing an opening 85, a pair of opposing surface lips 88 and an inner surface 87. The second ceramic layer 80 is roughly C-shaped when viewed from above. The base surface 82 of the second ceramic layer 80 is positioned above and contacts the top surface 44 of the first ceramic layer 40. The top surface 84 of the second ceramic layer 80 includes an unmetallized portion 89, and metallized portions including a microstrip ground 108, and a positive-side monitor circuit (or P-side monitor circuit) 110. The front surface 86 is coextensive with the front side 12 of the laser module 10, and includes the metallized ceramic portions 106 positioned on either side of the opening 85.

The third ceramic layer 120, best illustrated in FIGS. 4a, 4b, 4c, 4d, includes a base surface 122, a top surface 124, a front surface 126 containing an opening 125, and an inner surface 127. As with the second ceramic layer 80, the configuration of the third ceramic layer 120 is roughly C-shaped when viewed from above. However, the inner surface 127 includes a first groove 130, a second groove 132, and a third groove 134. Positioned between the first and second grooves 130, 132 is a first protrusion 136. Positioned between the second and third grooves 132, 134 is a second protrusion 138. Positioned adjacent to the third groove 134 is a third protrusion 140. The third ceramic layer 120 further includes a pair of surface lips 128 positioned opposite one another and surrounding the opening 125. The front surface 126 is coextensive with the front side 12 of the laser module 10, and includes the metallized ceramic portions 160 on either side of the opening 125.

The base surface 122 in the third ceramic layer 120 is positioned above and contacts the top surface 84 of the second ceramic layer 80. The top surface 124 of the third ceramic layer 120 includes an unmetallized ceramic portion 142. Further included on the top surface 124 are metal pads 162, 164, 166, 170, 174, a negative-side monitor circuit (or N-side monitor circuit) 168 and a microstrip 172.

The fourth ceramic layer 180, best illustrated in FIGS. 5a, 5b, 5c, 5d, includes a base surface 182, a top surface 184 and a front surface 186. The base surface 182 of the fourth ceramic layer 180 is positioned above and contacts the top surface 124 of the third ceramic layer 120. The top surface 184 of the fourth ceramic layer 180 includes the unmetallized ceramic portion 192 and a top metal layer 188. The front surface 186 is coextensive with the front side 12 of the laser module 10, and includes the metallized ceramic portion 210 and a cutout 190. The fourth ceramic layer 180 includes a rectangularly shaped opening 181 through the middle of the layer 180 such that one looking down upon the fourth ceramic layer 180 can see an optical subassembly 250 (described below) which will be contained within the laser module 10. The seal ring 220 (FIGS. 6, 7) includes a base surface 222 which is positioned above and contacts the top surface 184 of the fourth ceramic layer 180, and a top surface 224.

The ceramic layers 40, 80, 120, 180 are formed into their final configurations by industry standard ceramic processing techniques.

Once properly positioned, the ceramic layers 40, 80, 120, 180 create an open area 258 (FIG. 7) within the package body 11. The open area 258 is bounded by the cutouts 70, 190, the openings 85, 125, 181 and the inner surfaces 87, 127. Within this open area 258 is positioned the optical subassembly 250 ("OSA") which is shown schematically in FIG. 7 and in greater detail in FIGS. 8A, 8B, 8C, 8D. The ceramic layers 40, 80, 120, 180 form a housing for the optical subassembly 250.

The OSA 250 includes a laser 282, a backside monitor 264 and a collimating ball lens 286. Because the open area 258 is sufficiently large, the area 258 may optionally include either an optical isolator or an optical double isolator, shown schematically in FIG. 8a as isolator 290. In such a configuration, the OSA 250 is pushed up against a ledge 81 of the second ceramic pad 80 (FIG. 7) and the isolator 290 is positioned between the two ball lenses 286, 252. The OSA 250 rests upon the OSA ground 68, which is electrically connected to a Pin-two 22, the case ground of the laser module 10 (described below).

Figure 7:
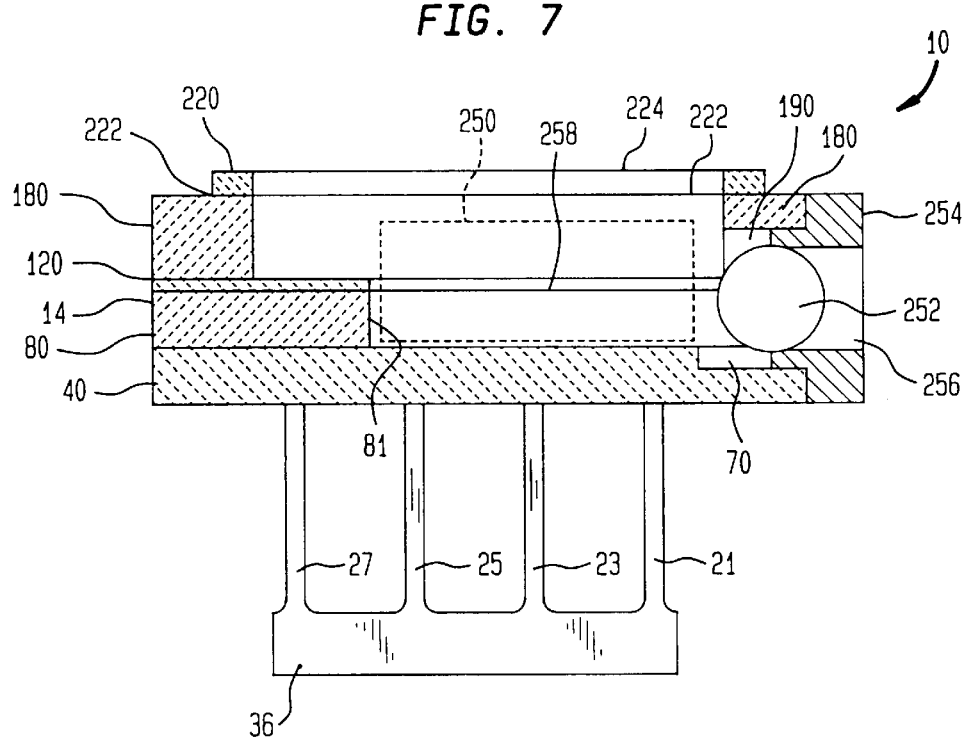
FIG. 7 is a cross-sectional view of the laser module of FIG. 1a taken along line VII—VII in FIG. 1c.
Figure 8A:
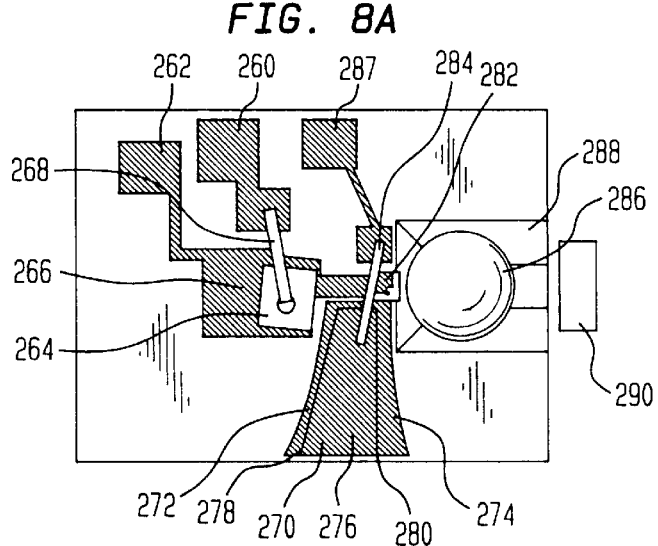
FIG. 8a is a top view of the optical subassembly shown schematically in FIG. 7.
Figure 8C:
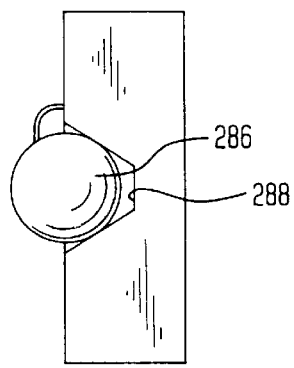
FIG. 8c is a front view of the optical subassembly shown schematically in FIG. 7.
Figure 8B:
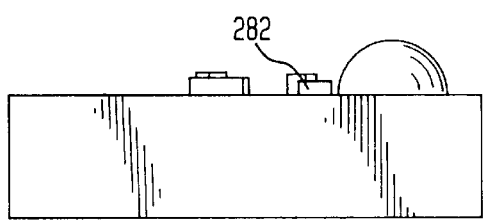
FIG. 8b is a side view of the optical subassembly shown schematically in FIG. 7.
Figure 8D:
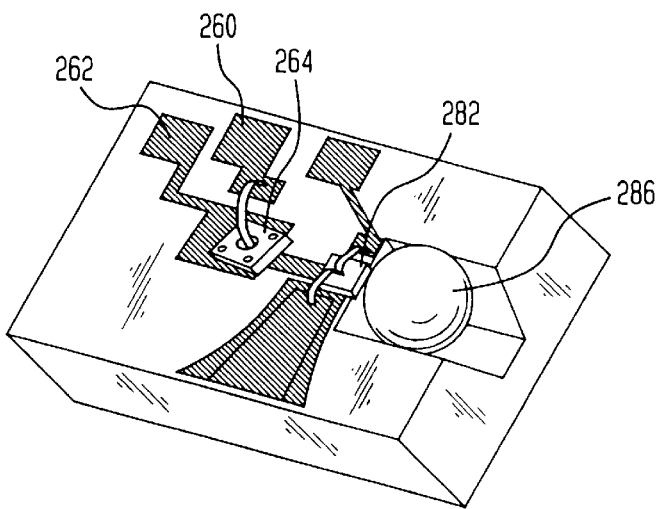
FIG. 8d is a perspective view of the optical subassembly shown schematically in FIG. 7.

With specific reference to FIG. 7, positioned forward of the OSA 250 is a focusing ball lens 252. The ball lens 252 is seated within the cutouts 70, 190, and fits within the openings 85, 125. A metal nose 254 is positioned forward of the front side 12 of the laser module 10 and affixed thereto. Specifically, the metal nose 254, which is formed of metal and is gold plated, is brazed to the metallized ceramic portions 66, 210 of, respectively, the first and fourth ceramic layers 40, 180.

Physically affixed and electrically connected to the package body 11 are eight pins. Specifically, pins one through four (Pin-one, Pin-two, Pin-three, Pin-four) 20, 22, 24, 26 are affixed to side 18 of the package body 11. Pins five through eight (Pin-five, Pin-six, Pin-seven, Pin-eight) 28, 30, 32, 34 are affixed to side 16 of the package body 11. The pins Pin-one through Pin-eight 20,22,24, 26, 28, 30, 32, 34 are at one end affixed to legs, respectively, 21, 23, 25, 27, 29, 31, 33, 35. Each of the legs 21, 23, 25, 27 ends at a tie-bar 36. Each of the legs 29, 31, 33, 35 ends at a tie-bar 38. The tie-bars 36, 38 are useful for shipping and assembly of the laser module 10. Specifically, the tie-bars 36, 38 prevent shear forces from breaking the electrical and physical connection of the pins 20, 22, 24, 26, 28, 30, 32, 34 from the sides 16, 18 of the package body 11. For testing and use of the laser module 10, the tie-bars 36, 38 can be trimmed or clipped off, leaving the ends of the legs 21, 23, 25, 27, 29, 31, 33, 35 exposed. The legs 21–35 are then fit into a ZIF socket which provides clamp contacts to each of the legs 21–35.

In actual use, the laser module 10 can be used in either a through-hole configuration or a gull wing configuration. If used in a through-hole configuration, the legs 21–35 each fit through a specific hole in the circuit board and are soldered thereto. If the gull wing configuration is used, each of the legs 21–35 is bent perpendicularly outwardly from the package body 11. The bent legs 21–35 are then soldered onto the circuit board. A solder paste is utilized which includes small coagulated portions of metal solder within the paste. The paste is then heated, which thereby heats the resident metal solder, and in this way the pins 21–35 are soldered to the circuit board.

Each of the pins 20–34 is electrically connected to at least one metallized ceramic portion. With specific reference to FIG. 1d, Pin-one 20 is physically connected to the metallized ceramic portion 50 and the metallized ceramic portion 90 of, respectively, the first and second ceramic layers 40, 80. The Pin-two 22 is physically connected to the metallized ceramic portions 52, 92 of, respectively, the first and second ceramic layers 40, 80. The Pin-three 24 is physically connected to the metallized ceramic portions 54, 94 of, respectively, the first and second ceramic layers 40, 80. The Pin-four 26 is physically connected to the metallized ceramic portions 56, 96 of, respectively, the first and second ceramic layers 40, 80.

Figure 1B:
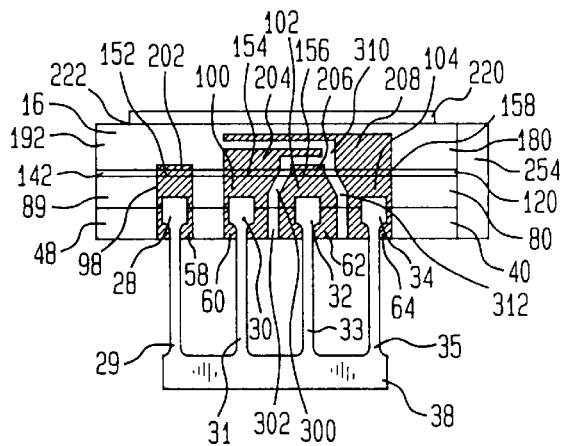

With specific reference to FIG. 1b, Pin-five 28 is physically connected to the metallized ceramic portions 58, 98 of, respectively, the first and second ceramic layers 40, 80. The Pin-six 30 is physically connected to the metallized ceramic portions 60, 100 of, respectively, the first and second ceramic layers 40, 80. The Pin-seven 32 is physically connected to the metallized ceramic portions 62, 102 of, respectively, the first and second ceramic layers 40, 80. The Pin-eight 34 is physically connected to the metallized ceramic portions 64, 104 of, respectively, the first and second ceramic layers 40, 80. Each of the pins 20–34 are affixed to the various metallized ceramic portions through the use of a metal braze.

Figure 1D:
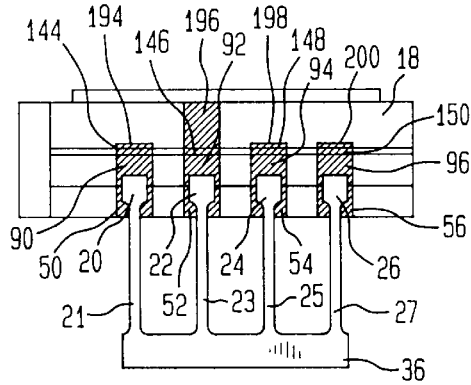
Figure 2A:
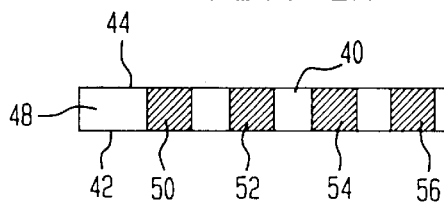
Figure 2B:
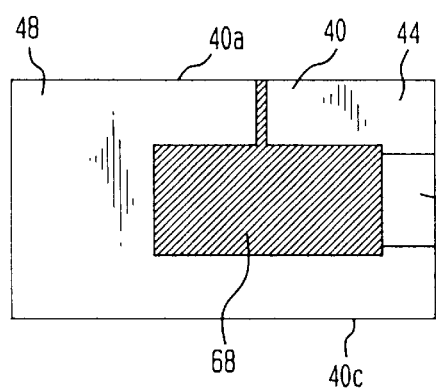

With specific reference to FIGS. 1b and 1d, it is noted that various metallized ceramic portions are in electrical connection with one another when the ceramic layers 40, 80, 120, 180 are stacked one upon another and fused together. Specifically, the metallized ceramic portions 50 and 90 (which are physically connected to Pin-one) are in electrical connection with the metallized portions 144, 194 and one another. Thus, these metallized portions 50, 90, 144, 194 are electrically connected to Pin-one 20. The metallized ceramic portions 52 and 92 (which are physically connected to Pin-two) are in electrical connection with the metallized portions 146, 196 and one another. Thus, these metallized portions 52, 92, 146, 196 are electrically connected to Pin-two 22. The metallized ceramic portions 54 and 94 (which are physically connected to Pin-three) are in electrical connection with the metallized portions 148, 198 and one another. Thus, these metallized portions 54, 94, 148, 198 are electrically connected to Pin-three 24. The metallized ceramic portions 56 and 96 (which are physically connected to Pin-four) are in electrical connection with the metallized portions 150, 200 and one another. Thus, these metallized portions 56, 96, 150, 200 are electrically connected to Pin-four 26.

With specific reference to FIG. 1b, the metallized ceramic portions 58 and 98 (which are physically connected to Pin-five) are in electrical connection with the metallized portions 152, 202 and one another. Thus, these metallized portions 58, 98, 152, 202 are electrically connected to Pin-five 28. The metallized ceramic portions 60 and 100 (which are physically connected to Pin-six) are in electrical connection with the metallized portions 154, 204 and one another. Thus, these metallized portions 60, 100, 154, 204 are electrically connected to Pin-six 30. The metallized ceramic portions 62 and 102 (which are physically connected to Pin-seven) are in electrical connection with the metallized portions 156, 206 and one another. Thus, these metallized portions 62, 102, 156, 206 are electrically connected to Pin-seven 32. The metallized ceramic portions 64 and 104 (which are physically connected to Pin-eight) are in electrical connection with the metallized portions 158, 208 and one another. Thus, these metallized portions 64, 104, 158, 208 are electrically connected to Pin-eight 34.

With specific reference to FIGS. 1A–5D, it is further noted that the various groupings of metallized ceramic portions which are electrically connected to one another are further electrically connected with various metal pads. With specific reference to FIGS. 1D, 2A and 2B, the metallized ceramic portions 52, 92, 146, 196 are further electrically connected to the OSA ground 68. Therefore, the OSA ground 68 is in electrical connection with the Pin-two 22, which acts as the case ground for the laser module 10.

Figure 3A:
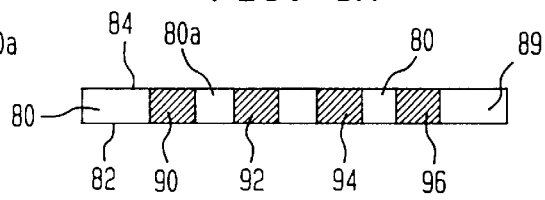
Figure 3B:
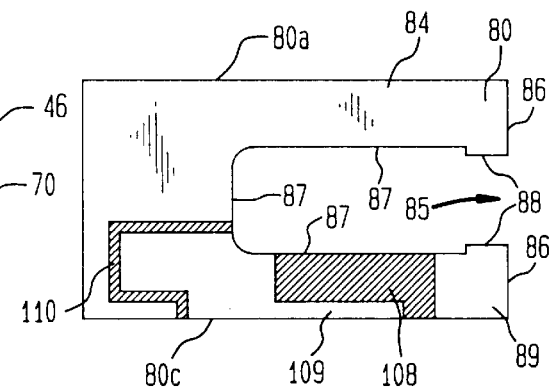
Figure 2C:
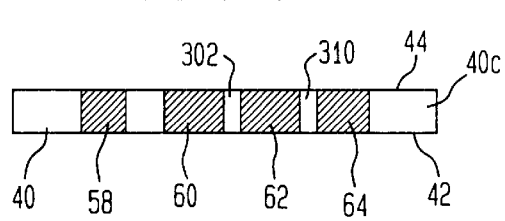
Figure 3C:
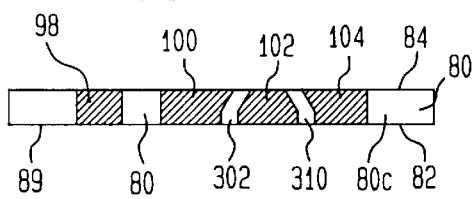
Figure 2D:
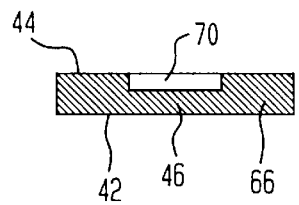
Figure 3D:
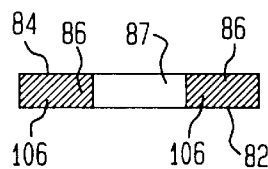

With specific reference to FIGS. 1b, 3b and 3c, the metallized portions 64, 104, 158, 208 are further electrically connected to the microstrip ground 108. Therefore, the microstrip ground 108 is electrically connected with the Pin-eight 34. Also with specific reference to FIGS. 1b, 3b and 3c, the metallized ceramic portions 58, 98, 152, 202, are further electrically connected with the P-side monitor circuit 110. Therefore, the P-side monitor circuit 110 is electrically connected with the Pin-five 28.

With specific reference to FIGS. 1d, 4a and 4b, the metallized ceramic portions 50, 90, 144, 194 are electrically connected to the metal pad 162. Therefore, the metal pad 162 is electrically connected to the Pin-one 22. The metallized ceramic portions 52, 92, 146, 196 are in electrical connection with the metal pad 164. Therefore, the metal pad 164 is in electrical connection with both the metal pad 68 (FIG. 2b) and the Pin-two 22.

The metallized ceramic portions 54, 94, 148, 198 are in electrical is connection with the metal pad 166. Therefore, the metal pad 166 is electrically connected with the Pin-three 24. Finally, the metallized ceramic portions 56, 96, 150, 200 are in electrical connection with the negative-side (N-side) monitor circuit 168. Therefore, the N-side monitor circuit 168 is electrically connected with the Pin-four 26.

With specific references to FIGS. 1b, 4b and 4c, the metallized ceramic portions 60, 100, 154, 204 are in electrical connection with the metal pad 170. Therefore, the metal pad 170 is electrically connected with the Pin-six 30. The metallized ceramic portions 62, 102, 156, 206 are in electrical connection with the microstrip 172. Therefore, the microstrip 172 is electrically connected with the Pin-seven 32.

With specific reference to FIGS. 1d, 5a and 5b, the metallized ceramic portions 52, 92, 146, 196 are in electrical connection with the top metal layer 188, which is further in electrical connection with the metallized ceramic portion 210. Therefore, the metallized ceramic portion 210 and the top metal layer 188 are electrically connected with the Pin-two 22, and thus, also electrically connected to the metal pads 68, 164.

Next will be described the electrical circuitry of the laser module 10. An important feature of the laser module 10 is that it is adapted to be flexible with regard to the type of signal to be transmitted from the laser 282. More specifically, the laser module 10 is adapted to accept one ground pin and one signal pin for a low-bit rate and/or low frequency input signal to the laser 282 as well as two ground pins and one signal pin for a high-bit rate and/or high frequency input signal. By low-bit rate or low frequency, what is meant is a bit rate in the range of one gigabit or one gigahertz of bandwidth. With regard to high-bit rate or high frequency, what is meant is bit rates of up to ten gigabit/ second, or approximately ten gigahertz of bandwidth. This flexibility is obtained through two discrete electrical signal path configurations within the laser module 10.

Next will be described a signal-ground electrical signal path configuration which is utilized for low-bit rate signals and/or low frequencies, and which is illustrated equivalently in FIG. 10. A radio frequency (RF) signal is sent from a driver (not shown) through the circuit board (not shown) to Pin-six 30. The RF signal can be any form of signal, namely a sine wave, a square wave or any signal wave therebetween. In the signal-ground electric configuration, Pin-six 30 is considered the input signal pin, and Pin-seven 32 is considered the ground.

In the signal-ground configuration, a characteristic line is created along the side wall 16. Characteristic lines, or transmission lines, of which coplanar waveguides and microstrips are examples, allow for the transmission of an RF signal with little loss in bandwidth. More specifically, the metallized portions 60, 100, 154, 204 in electrical connection with Pin-six 30, and the metallized portions 62, 102, 156, 206 in electrical connection with Pin-seven 32, as well as the gap 302 positioned between each grouping of metallized ceramic portions make up a characteristic line, shown as the signal-ground coplanar waveguide 300. The gap 302 of the coplanar waveguide 300 is thin enough to allow interaction of the RF signal between the metal portions in electrical connection with the signal (Pin-six 30) and the metal portions in electrical connection with the ground (Pin-seven 32) as the signal moves up the coplanar waveguide 300 along the side wall 16.

The RF signal, having moved vertically up the coplanar waveguide 300, now moves into the laser module 10. As the signal moves into the laser module 10, there is a large gap between metallized portions. This large gap halts the interaction of the signal between the signal (Pin-six 30) and the ground (Pin-seven 32), thereby breaking the waveguide 300. This break results in a loss of bandwidth. More specifically, with reference to FIG. 4b, the electrical signal moves into the laser module 10 through the metal pad 170 and the microstrip 172. Please note, however, that the microstrip 172 does not act as a microstrip in the signal-ground configuration, but instead acts merely as a metal pad allowing the signal to move into the laser module 10. A large gap 133 exists between the metal pads 170, 172. Unlike the small gap 302 within the coplanar waveguide 300, this large gap 133 is of great enough width to prevent the metal pads 170, 172 and the gap 133 from acting as a waveguide for the RF signals. Instead, the metal pad 170 acts as a signal pad and the metal pad 172 acts as a ground pad, thus allowing the signal to continue on into the interior of the package body 11. The metal pads 170, 172 are wire bonded to a second characteristic line, shown as the coplanar waveguide 270 in the optical subassembly 250.

The signal enters the optical subassembly coplanar waveguide 270 and then goes into the laser 282, which emits modulated light. In a preferred embodiment, the laser 282 is a chip having a resistance of five ohms. Whether the RF signal is a digital signal, an analog signal, or any combination of the two, the laser 282 directly emits a corresponding optical signal. The modulated light signal exits the laser 282 as an optical signal and enters an optical fiber.

Figure 10:
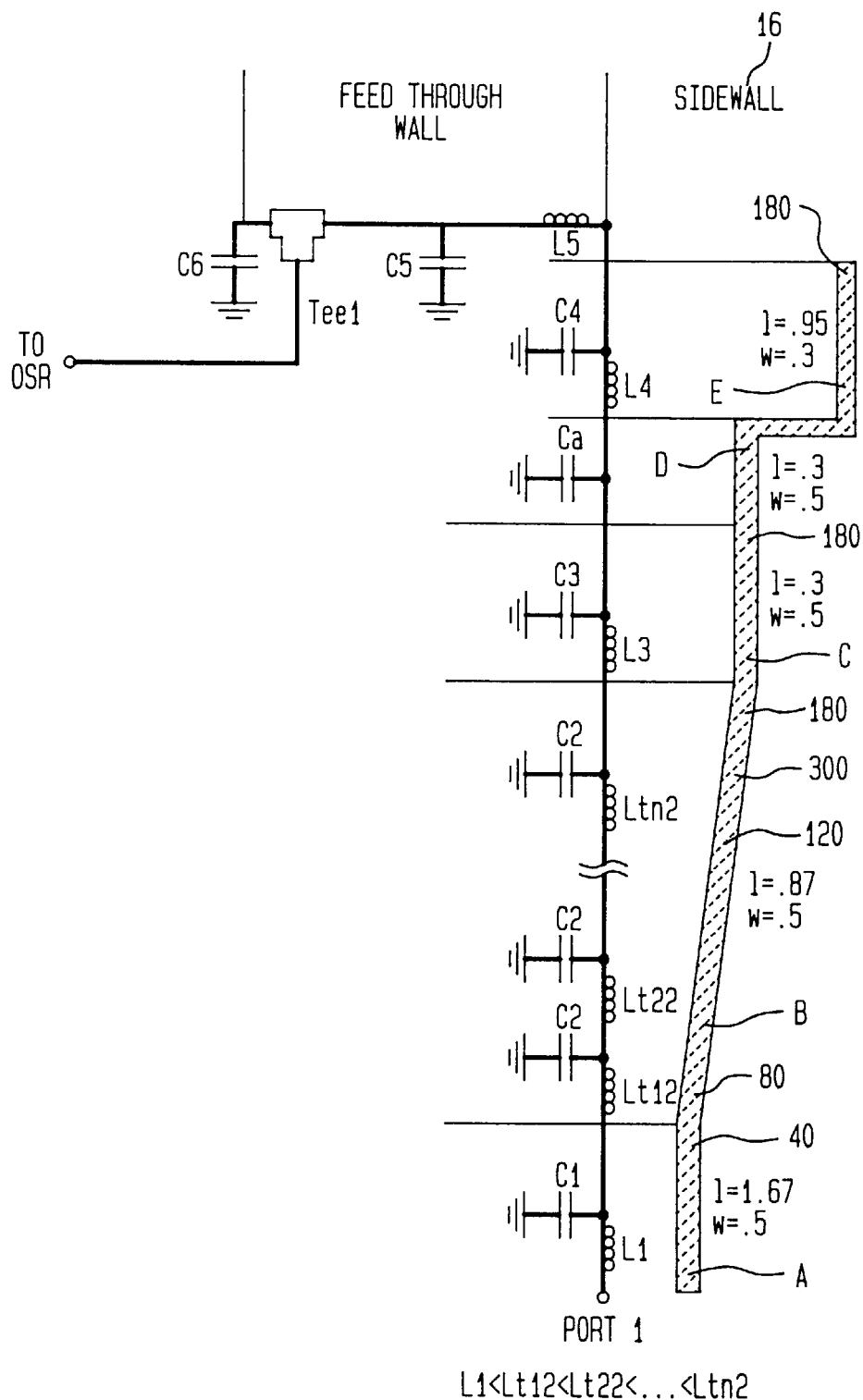

The signal-ground configuration is shown equivalently in FIG. 10. As the signal moves up the sidewall 16, the signal encounters inductors L1, Lt12, Lt22, Ltn2, L3 and L4 and capacitors C1, C2, C3, Ca and C4. The generally vertical line on the right-hand side of FIG. 10 denotes the conducting elements A–E of the coplanar waveguide 300. The conducting elements A–E have varying lengths, and varying sizes of gaps therebetween. For example, the length of the conducting elements A, which run through the ceramic layer 40, is 1.67 millimeters, while the size of the gap between the conducting elements A is 0.5 millimeters. The length of the conducting elements B, which run through the ceramic layers 80, 120 and into the ceramic layer 180, is 0.87 millimeters, while the size of the gap between the conducting elements B is 0.5 millimeters. The lengths of the conducting elements C and D, which are on the ceramic layer 180, are each 0.3 millimeters, while the sizes of the gaps between the conducting elements C and D are 0.5 millimeters. The length of the conducting elements E, which are on the ceramic layer 180, is 0.95 millimeters, while the size of the gap between the conducting elements E is 0.3 millimeters.

As the signal goes from the signal-ground coplanar 300 into the package body 11, the signal encounters an inductor L5 prior to going to the OSA 250.

It is to be understood that the signal-ground configuration illustrated in FIG. 10 is an exemplary embodiment and that the specific values described and illustrated (lengths and sizes of gaps) may be altered without departing from the invention.

Next will be described the ground-signal-ground electrical signal path configuration of the laser module 10, which signal path is illustrated equivalently in FIG. 9. In the ground-signal-ground electrical configuration, Pin-seven 32 is the input signal pin and Pin-six 30 and Pin-eight 34 are the grounds. Please note that in the ground-signal-ground electrical configuration, the signal pin (Pin-seven 32) is sandwiched between both grounds (Pin-six 30 and Pin-eight 34). As with the signal-ground configuration, a characteristic line is positioned on the side 16. More specifically, a characteristic line, shown as a ground-signal-ground coplanar waveguide 310 is positioned along the side 16. The ground-signal-ground coplanar waveguide 310 includes the metallized portions and the gap 302 of the signal-ground coplanar waveguide 300 as well as the metallized portions 64, 104, 158, 208 and the gap 312. The ground-signal-ground coplanar waveguide 310 is a more efficient characteristic line, or transmission line, than the signal-ground coplanar waveguide 300 due to the placing of the input signal between two grounds.

Thus, for the ground-signal-ground electrical configuration, a high speed RF signal is received from a driver (not shown) through the circuit board (not shown) by Pin-seven 32. The RF signal is then transmitted from the Pin-seven 32 to the ground-signal-ground coplanar waveguide 310. The signal then moves to the interior of the laser module 10.

More specifically, the RF signal comes through Pin-seven 32 through the ground-signal-ground coplanar waveguide 310 to a second characteristic line, shown as the microstrip 172. In a preferred embodiment, the microstrip 172 has a characteristic impedance of twenty-five ohms and an electrical length of approximately one millimeter. The two grounds Pin-six 30 and Pin-eight 34 are connected in the interior of the laser module 10 by way of a wire bond from the metal pad 170 (FIG. 4b) and the microstrip ground 108 (FIG. 3b). The connection of grounds Pin-six and Pin-eight 30, 34 must be done on the interior of the laser module 10.

With specific reference to FIG. 3b, the microstrip ground 108 is basically shaped as a backward L. There is a gap 109 along the long leg of the microstrip ground 108. This gap 109 prevents the microstrip ground 108 from coming into connection with either Pin-six 30 or Pin-seven 32. If the microstrip ground 108 was extended completely to the edge, namely to the side 16, and no gap 109 was present, this configuration would short out Pin-six 30 and Pin-seven 32.

In the ground-signal-ground configuration, the microstrip 172 adds unwanted inductance to the electrical signal path configuration. Hence, it is necessary to provide extra capacitance to the signal path. This is accomplished through the configuration of the microstrip 172. With specific reference to FIG. 4b, the microstrip 172 has a wide portion 173 and a thinner portion. The wide portion 173 provides added capacitance to the electrical configuration, thus balancing the inductance provided by the microstrip 172.

Figure 9:
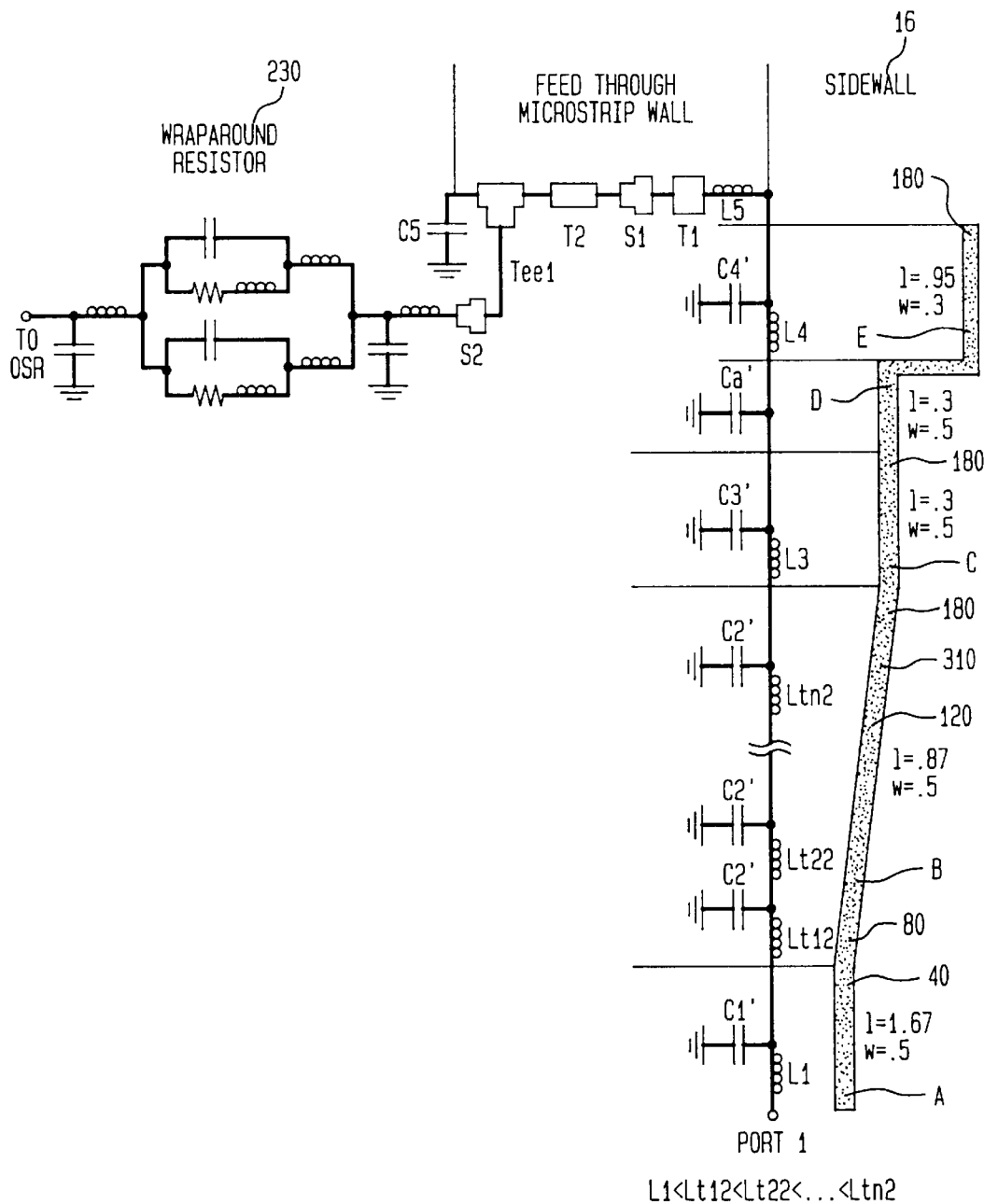

The signal-ground configuration is shown equivalently in FIG. 9. As the signal moves up the sidewall 16, the signal encounters the inductors L1, Lt12, Lt22, Ltn2, L3 and L4, as described previously regarding the signal-ground configuration. The signal also encounters capacitors C1', C2', C3', Ca' and C4', which may have different values than the capacitors C1, C2, C3, Ca and C4 shown in FIG. 10. The conducting elements A–E have the same conducting element lengths and gap sizes between conducting elements as described with reference to FIG. 10.

It is to be understood that the ground-signal-ground configuration illustrated in FIG. 9 is an exemplary embodiment and that the specific values described and illustrated (lengths and sizes of gaps) may be altered without departing from the invention.

As the signal goes from the coplanar waveguide 310 into the package body 11, the signal encounters an inductor L5, a transmission line T1 which is at about twenty-eight ohms, a step discontinuity S1, and a second transmission line T2 at about twenty-five ohms. The signal then encounters a second step discontinuity S2 prior to encountering the resistor 230 and going to the OSA 250.

To minimize signal loss and reflections, it is preferred to match all input and output impedances in an electrical signal path. However, semiconductor lasers have become somewhat standardized in the industry at five ohms, while the resistance of printed circuit boards has become somewhat standardized at twenty-five ohms. Further, placing down five ohm lines on a printed wiring board would be prohibitively difficult. While no loss would be optimal, some loss is preferable in order to maintain a transmission line to the laser from the printed circuit board.

The ground-signal-ground coplanar waveguide 310 is preferably a forty-four ohm characteristic impedance waveguide. As shown in FIG. 9, however, the impedance fluctuates moving up the sidewall 16. The variation is due to infinitesimal changes in inductance caused by variations in the length of wire and the gap between the metallization traces in the coplanar waveguide 310. The microstrip 172 is preferably a twenty-five ohm characteristic impedance microstrip, and the OSA coplanar waveguide 270 is also preferably rated at a characteristic impedance of twenty-five ohms. Preferably, a matching twenty ohm wrap-around resistor 230 is positioned on the top of the microstrip 172 and wire bonded to the OSA coplanar waveguide 270. In this way, the RF signal can move from the microstrip 172 through the OSA coplanar waveguide 270 to the five ohm laser 282, allowing the laser 282 to transmit the light to an optical fiber.

Next will be described some of the components of the optical subassembly 250. The OSA 250 includes both a laser 282 and a backside monitor 264. The monitor 264 is provided in order to monitor the amount of continuous wave (CW) power from the laser 282. The monitor 264 is connected to the Pin-four 26 through an N-side monitor pad 262 and to the Pin-five 28 through a P-side monitor pad 260. The connection of the monitor pads 260, 262 to the Pin-four 26 and Pin-five 28 is through the P-side and N-side monitor circuits 110, 168, respectively. With specific reference to FIG. 3b and FIG. 3b, the P-side and N-side monitor circuits 110, 168 are kept well removed from the electrical circuitry utilized for the laser 282, namely the microstrip ground 108, the microstrip 172 and the metal pad 170. If the monitor circuitry 110, 168 is placed too close to the laser circuitry, the monitor will pick up RF signal intended for the laser 282. While picking up the RF signal will have no deleterious effect on the monitor 264, it will, however, degrade the bandwidth of the input signal to the laser 282.

The optical subassembly 250 may also include an isolator 290. The isolator 290 is utilized for isolating the optical generator to the outside environment. Stated differently, the isolator 290 inhibits an optical signal from coming back from the fiber optic network. Optical signals which come back after being transmitted by the laser 282 will be picked up and retransmitted by the laser 282. Due to the configuration of the laser module 10, it is possible to place an isolator 290 within the optical subassembly 250. A standard isolator provides forty decibels of isolation. Thus, for example, for a signal of one milliwatt, the isolator 290 would allow only one-tenth microwatt of a signal to come back.

The configuration of the laser module 10 allows for a double isolator 290a to be incorporated within the optical subassembly 250. The double isolator 290a works the same as an isolator 290; however, standard double isolators 290a provide fifty decibels of isolation, which permits even less of a signal to come back.

The backside monitor 264 sits atop a backside monitor metal pad 266. The metal pad 266 abuts with and is electrically connected to the N-side monitor pad 262. Further, a ribbon bond 268 electrically connects the backside monitor 264 with the P-side monitor. Through this arrangement, continuity is provided with respect to the backside monitor 264 between the monitor pads 260, 262.

The OSA coplanar waveguide 270 includes a first ground 272 and a second ground 274 on either side of a coplanar center conductor 276. Between the first ground 272 and the conductor 276 is a first gap 278, and between the second ground 274 and the conductor 276 is a second gap 280. The two grounds 272, 274 extend underneath the laser 282. A ribbon bond 284 provides electrical connection between the laser 282, the center conductor 276 and a test pad 287. The test pad 287 is used to test direct current (DC) power going to the laser 282.

As described above, a preferred embodiment of the laser module of the present invention is capable of transmitting to a laser RF signals ranging from analog DC to 10 gigahertz and DC to approximately ten gigabits digital signals. The preferred embodiment accomplishes this through two discrete signal path configurations.

The above description and drawings are only illustrative of certain preferred versions which achieve the objects, features and advantages of the present invention. It is not intended that the present invention be limited to these versions. For example, while the laser module 10 is described as having eight pins, it is to be understood that more or less pins may be included in the module 10 to provide the desired result. Further, while the package body 11 is described as including four ceramic layers, the layers may be formed of any suitable insulating material, and the number of layers may be altered. Further, while the coplanar waveguides and the microstrip have been described with preferred characteristic impedances, these characteristic impedances may be altered.

What is claimed as new and desired to be protected by Letters Patent of the United States is:

1. A laser module having a body and being adapted for use with a semiconductor laser, comprising:
    a first RF signal path within said body and adapted for receiving and transmitting to an input of a laser radio frequency signals at one gigahertz or below; and
    a second RF signal path within said body and adapted for receiving and transmitting to an input of the laser radio frequency signals at up to ten gigahertz.

2. The laser module of claim 1, wherein said first RF path is a signal-ground path and said second RF path is a ground-signal-ground path.

3. The laser module of claim 2, wherein said second RF path includes:
    an input signal pin and two ground pins;
    a ground-signal-ground characteristic line in electrical connection with said signal pin and said ground pins;
    a metal pad in connection with said ground-signal-ground characteristic line; and
    a second characteristic line and a microstrip ground, each in electrical connection with said ground-signal-ground characteristic line and each adapted to be electrically connected with a laser.

4. The laser module of claim 3, wherein said ground-signal-ground characteristic line is a coplanar waveguide and said second characteristic line is a microstrip.

5. The laser module of claim 2, wherein said first RF path includes:
    an input signal pin and a ground pin;
    a signal-ground characteristic line in electrical connection with said signal pin and said ground pin; and
    a pair of metal pads in electrical connection with said signal-ground characteristic line and adapted to be electrically connected with a laser.

6. The laser module of claim 5, wherein said second characteristic line is one of said metal pads in electrical connection with said signal-ground characteristic line.

7. The laser module of claim 5, wherein said signal-ground characteristic line is a coplanar waveguide.

8. The laser module of claim 7, wherein said ground pin of said first RF path is said signal pin of said second RF path.

9. The laser module of claim 8, wherein the module is through-hole configured.

10. The laser module of claim 9, further including a semiconductor laser, said laser capable of producing optical energy.

11. The laser module of claim 10, wherein the module is uncooled.

12. The laser module of claim 11, further comprising a package body having metallized and unmetallized portions.

13. The laser module of claim 12, wherein said package body is generally rectangular with a pair of opposed long sides and a pair of opposed short sides, each said long side including some of said metallized portions.

14. The laser module of claim 13, wherein said package body is formed of a plurality of insulator layers, said layers being stacked one upon another and fused together.

15. The laser module of claim 14, wherein said package body includes a seal ring positioned above and contacting one of said layers.

16. The laser module of claim 13, further including a plurality of pins, wherein some of said pins contact metallized portions on one of said long sides and the other of said pins contact metallized portions on the other of said long sides.

17. The laser module of claim 16, further including:
   a focusing bail lens positioned in an opening of one of said short sides; and
   a metal nose affixed to said short side having said opening.

18. The laser module of claim 17, further including an optical subassembly positioned within an open area of said package body, said subassembly including said laser, wherein said metallized portions on said long sides establish said first RF signal path from some of said pins to said optical subassembly and said second RF signal path from some of said pins to said optical subassembly.

19. The laser module of claim 14, wherein said insulator layers include a ceramic material.

20. The laser module of claim 16, wherein said plurality of pins includes four pins on one of said long sides and four pins on the other of said long sides.

21. The laser module of claim 18, wherein said optical subassembly further includes a backside monitor for monitoring the amount of power from said laser.

22. The laser module of claim 21, further including a P-side monitor circuit and an N-side monitor circuit, both said circuits in electrical connection with said backside monitor, said P-side and N-side circuits providing a low capacitance to the module through said backside monitor.

23. The laser module of claim 18, wherein said optical subassembly further includes a collimating ball lens for collimating said optical energy.

24. The laser module of claim 23, wherein said optical subassembly further includes a subassembly ground for electrically grounding said optical subassembly.

25. The laser module of claim 4, wherein said microstrip is adapted to provide added capacitance to said second RF path.

26. A housing for an optical assembly, said housing adapted to receive and input to a laser both low-bit rate radio frequency signals, at one gigahertz or below, and high-bit rate radio frequency signals, at up to ten gigahertz, said housing comprising:
   an assembly body having metallized and unmetallized portions; and
   a plurality of pins, wherein said pins contact said metallized portions and wherein some of said pins and some of said metallized portions establish a first and a second RF signal path, said first RF signal path adapted to provide driver signals to a laser at one gigahertz or below, said second RF signal path adapted to provide driver signals to a laser at up to ten gigahertz.

27. The housing of claim 26, wherein said metallized portions establish a first low-bit rate RF path from some of said pins to said optical assembly and a second high-bit rate RF path from some of said pins to said optical assembly.

28. The housing of claim 27, wherein said first RF path is a signal-ground path adapted for receiving and transmitting to an input of a laser radio frequency signals at one gigahertz or below, and said second RF path is a ground-signal-ground path adapted for receiving and transmitting to an input of a laser radio frequency signals up to ten gigahertz.

29. The housing of claim 28, wherein one of said pins is adapted to be an input signal pin for said second RF path and two of said pins are adapted to be ground pins for said second RF path, said second RF path further including:
   a ground-signal-ground characteristic line in electrical connection with said signal pin and said ground pins;
   a metal pad in electrical connection with said ground-signal-ground characteristic line; and
   a second characteristic line and a microstrip ground, each in electrical connection with said ground-signal-ground characteristic line and each adapted to be electrically connected with a laser.

30. The housing of claim 29, wherein said ground-signal-ground characteristic line is a coplanar waveguide and said second characteristic line is a microstrip.

31. The housing of claim 30, wherein one of said pins is adapted to be an input signal pin for said first RF path and one of said pins is adapted to be a ground pin for said first RF path, said first RF path further including:
   a signal-ground characteristic line in electrical connection with said signal pin and said ground pin of said first RF path; and
   a pair of metal pads in electrical connection with said signal-ground characteristic line and adapted to be electrically connected with a laser.

32. The housing of claim 31, wherein said signal-ground characteristic line is a coplanar waveguide.

33. The housing of claim 32, wherein said ground-signal-ground coplanar waveguide includes three groupings of metallized portions, a first grouping in electrical contact with said signal pin, a second grouping in electrical contact with one of said ground pins, and a third grouping in electrical contact with the other of said ground pins.

34. The housing of claim 33, wherein said signal-ground coplanar waveguide includes two of said three groupings of metallized portions, one of said two groupings in electrical contact with said signal pin of said first RF path and the other of said two groupings in electrical contact with said ground pin of said first RF path.

35. The housing of claim 34, wherein said ground pin of said first RF path is said signal pin of said second RF path.

36. The housing of claim 25, wherein said assembly body is generally rectangular with a pair of opposed long sides and a pair of opposed short sides, each of said long sides including some of said metallized portions and some of said unmetallized portions.

37. The housing of claim 36, wherein said assembly body is formed of a plurality of insulator layers, said layers being stacked one upon another and fused together.

38. The housing of claim 37, wherein said insulator layers are formed of ceramic.

39. The housing of claim 38, wherein said assembly body further includes a seal ring positioned above and contacting one of said layers.

40. The housing of claim 26, wherein said optical assembly is positioned within an open area of said assembly body and includes a laser capable of producing optical energy and a collimating ball lens for collimating the optical energy.

41. The housing of claim 40, wherein said optical assembly includes a backside monitor for monitoring the amount of optical power from said laser.

42. The housing of claim 41, wherein said optical assembly includes a ground for electrically grounding said optical assembly.

43. The housing of claim 42, wherein said optical assembly includes an optical isolator for reducing the amount of optical energy reflected back into the housing.

44. The housing of claim 43, wherein said optical isolator is a double optical isolator.

45. A laser module having a body and being adapted for use with a semiconductor laser, comprising:
- a first RF signal path within said body and adapted to provide driver signals to a laser, wherein said first RF signal path is a signal-ground path; and
- a second RF signal path within said body and adapted to provide driver signals to a laser, wherein said second RF signal path is a ground-signal-ground path.

46. The laser module of claim 45, wherein said second RF path includes:
- an input signal pin and two ground pins;
- a ground-signal-ground characteristic line in electrical connection with said signal pin and said ground pins; and
- a second characteristic line and a microstrip ground, each in electrical connection with said ground-signal-ground characteristic line.

47. The laser module of claim 46, wherein said second RF path includes a metal pad in connection with said ground-signal-ground characteristic line.

48. The laser module of claim 46, wherein said ground-signal-ground characteristic line is a coplanar waveguide and said second characteristic line is a microstrip.

49. The laser module of claim 45, wherein said first RF path includes:
- an input signal pin and a ground pin;
- a signal-ground characteristic line in electrical connection with said signal pin and said ground pin; and
- a pair of metal pads in electrical connection with said signal-ground characteristic line.

50. The laser module of claim 49, wherein said second characteristic line is one of said metal pads in electrical connection with said signal-ground characteristic line.

51. The laser module of claim 49, wherein said signal-ground characteristic line is a coplanar waveguide.

52. The laser module of claim 45, further including a semiconductor laser, said laser capable of producing optical energy.

53. The laser module of claim 52, wherein the module is uncooled.

54. The laser module of claim 49, comprising a package body having metallized and unmetallized portions.

55. The laser module of claim 54, wherein said package body is generally rectangular with a pair of opposed long sides and a pair of opposed short sides, each said long side including some of said metallized portions.

56. The laser module of claim 54, wherein said package body is formed of a plurality of insulator layers, said layers being stacked one upon another and affixed together.

57. The laser module of claims 45, wherein said signal-ground path is adapted for receiving and transmitting radio frequency signals at one gigahertz or less.

58. The laser module of claim 45, herein said ground-signal-ground path is adapted for receiving and transmitting radio frequency signals at between one gigahertz and ten gigahertz.

* * * * *

UNITED STATES PATENT AND TRADEMARK OFFICE
CERTIFICATE OF CORRECTION

PATENT NO. : 6,618,407 B1  Page 1 of 1
DATED : September 9, 2003
INVENTOR(S) : George Edward Andrews et al.

It is certified that error appears in the above-identified patent and that said Letters Patent is hereby corrected as shown below:

Column 1,
Line 6, delete "particular" and replace with -- particularly --.

Column 11,
Line 11, delete "FIG. 3b and FIG. 3b" and replace with -- FIG. 3b and FIG. 4b --.

Column 16,
Line 13, delete "claim 49" and replace with -- claim 45 --.
Line 25, delete "herein" and replace with -- wherein --.

Signed and Sealed this

Sixteenth Day of March, 2004

JON W. DUDAS
*Acting Director of the United States Patent and Trademark Office*